Patented Jan. 23, 1951

2,538,802

UNITED STATES PATENT OFFICE 2,538,802

METHOD OF MANUFACTURING CALCIUM CARBONATE

Milton O. Schur, Asheville, and Robert M. Levy, Brevard, N. C., assignors to Ecusta Paper Corporation, a corporation of Delaware No Drawing. Application May 3, 1947, Serial No. 745,728

4 Claims. (Cl. 23—66)

Our invention relates to the production of calcium carbonate and more especially to obtaining calcium carbonate of the proper size particles to serve as a filler for cigarette paper and impart to the paper the desired porosity and opacity characteristics.

Although this calcium carbonate may be used for other purposes, it is particularly adapted for use as a filler in cigarette paper. If the particles of calcium carbonate are too small, that is, if the calcium carbonate has too high a proportion of fine particles, its use as a filler in cigarette paper will result in paper less porous than desired, for the permissible amounts of filler in the paper. Contra, if the particles of calcium carbonate filler are too large or coarse the paper will not have sufficient opacity.

Heretofore, it has been a major commercial problem to produce calcium carbonate filler within the exacting requirements for good porosity and opacity in cigarette paper. The difficulty has been the lack of any definite control over the particle sizes of the precipitated calcium carbonate. These sizes would vary widely from one production to the next and there seemed to be no reliable way to produce each batch within predetermined specifications. Successive productions would have unpredictable particle size distributions and oftentimes a batch of the calcium carbonate so produced could not be used satisfactorily as filler for the cigarette paper.

Our research was directed to an understanding of this problem and to the development of a reliable method for consistently producing calcium carbonate of the desired particle sizes. This result has been finally achieved by the method of our present invention.

It is based upon our discovery that calcium carbonate of fine particle size can be reliably converted into larger size particles by subjecting an aqueous suspension of the fine particle carbonate to the influence of the precipitation reaction between calcium hydroxide and carbon dioxide gas which are introduced into the aqueous suspension of fine particle carbonate. Under this condition, we find that the percentage of small particles diminishes, and that after sufficient calcium carbonate has been precipitated for a given quantity of the relatively fine calcium carbonate initially present, the desired particle sizes are obtained in the entire batch of calcium carbonate.

Other factors being constant, the degree of "coarsening," or diminishing the percentage of small particles, mentioned above, depends upon the amount of calcium carbonate precipitated in the presence of the initial fine calcium carbonate. For the production of a final calcium carbonate of given average particle size, the finer the initial calcium carbonate, the more calcium hydroxide must be precipitated in its presence in order to produce any given average particle size for the entire batch. Conversely, if the initial calcium carbonate is less fine, less calcium carbonate must be precipitated in its presence in order to obtain the given average particle size for the entire batch.

By sampling the batch, after the conditioning precipitation has progressed for some time, and testing the samples for particle size, we can terminate the precipitation process at the time when the proportion of fine particles has been reduced to the desired extent.

A fundamental and essential feature of our method is the precipitation of the calcium carbonate in the presence of a suspension of previously produced calcium carbonate of fine particle size.

In the commercial practice of our invention, we have found it advantageous to carry out the conditioning precipitation or coarsening process in batches, that is, to complete the precipitation, and then remove the entire batch of precipitated calcium carbonate from the carbonator.

If desired, the conditioning precipitation method may be carried out continuously, instead of in batches, and the final precipitated calcium carbonate drawn off continuously. In such a procedure it is necessary to introduce continuously during the conditioning precipitation a supply of the previously prepared calcium carbonate suspension having fine particles so that the subsequent precipitation will be carried out in the presence of this previously produced fine product.

In carrying out our process for coarsening calcium carbonate particles according to a continuous method, we may use one, two, or more carbonators. Where more than one carbonator is used, we prefer to have the carbonators in series, i. e., to flow the initial calcium carbonate suspension through the system from one carbonator to the next in the series, and to divide among the carbonators the lime which is to be carbonated in the presence of the calcium carbonate initially present.

The fine particle size calcium carbonate with which we start may be obtained in several ways. Among the methods of preparing fine carbonate are the following: precipitation from calcium hydroxide suspension by reaction with carbon dioxide under predetermined conditions of concentration, temperature, and agitation; vigorous agitation of a calcium carbonate suspension, after precipitation; wet-milling of calcium carbonate; dry-grinding of precipitated calcium carbonate followed by air separation.

A commercially advantageous procedure for the preparation of this fine particle calcium carbonate suspension comprises, first, producing slaked lime, and then precipitating this slaked lime solution with carbon dioxide gas. A specific, non-limiting example of this procedure is as follows:

Slaking 2,330 pounds of regular commercial grade, pebble size, rotary kiln quick lime (CaO) obtained from Mississippi Lime Company were charged into a tank containing 880 gallons of water initially at 95° C. The lime was added at a substantially uniform rate over a period of about 25 minutes. After the lime had all been added, the contents of the tank were agitated for ½ hour by means of a stream of compressed air. The contents of the tank were then diluted to 1,200 gallons with filtered river water. Agitation was continued for another ½ hour, whereupon the suspension was passed through a coarse screen, about ¼ inch mesh, then through a fine screen, about 100 mesh, and was finally pumped through a centrifugal cleaner to remove mechanical impurities.

Carbonating 1,000 gallons of the above slaked lime were pumped into a tank approximately 5 feet in diameter and 10 feet high. The concentration of this suspension was adjusted to 180 grams of $Ca(OH)_2$ per liter, and the temperature to 40° C. Washed, boiler-house, flue gas, containing approximately 10% carbon dioxide, was now fed into the milk of lime at the rate of about 600 cubic feet per minute. This carbonating treatment was continued for 12 hours, after which time substantially all the $Ca(OH)_2$ in the tank had been converted to $CaCO_3$.

The calcium carbonate produced in the above example had a higher proportion of fine particles than we desired in a filler to be used in the manufacture of an important type of commercial cigarette paper. The particle size distribution of this calcium carbonate, as determined with an Andreasen pipette, and using sodium hexametaphosphate as dispersing agent, was as follows:

| Particle Sizes | Per Cent by Weight |
| --- | --- |
| 0-1 microns | 28 |
| 1-2 microns | 52 |
| 2-3 microns | 8 |
| 3-4 microns | 4 |
| 4-6 microns | 3 |
| 6-8 microns | 3 |
| 9-10 microns | 2 |
| above 10 microns | 0 |
| | 100 |

The weight-average particle size of this calcium carbonate was 1.8 microns.

The Andreasen pipette is a standard piece of laboratory apparatus which can be purchased from many scientific supply houses. In the preparation of the sample to be examined with the pipette, we introduce a volume of slurry containing approximately 2 grams of solids and then add distilled water to the dilution mark on the pipette provided for the purpose. The distilled water used for diluting purposes contains approximately 0.15 grams of sodium hexametaphosphate dissolved therein. The function of the sodium hexametaphosphate is to disperse the calcium carbonate so as to insure free settling.

To convert the fine particle, calcium carbonate suspension, prepared as above described, to one containing a substantially lower percentage by weight of fine particles, in accordance with our invention, we subjected the suspension to our conditioning precipitation method as follows:

Conditioning precipitation

We diluted the calcium carbonate suspension to 140 grams of solids per liter. 50 gallons of this suspension was pumped into a tank 2 feet in diameter and 10 feet high. The tank was then about ¼ full. We next fed into this suspension or slurry a slow stream of milk of lime having a concentration of 100 grams per liter of calcium hydroxide. This lime was added at approximately 1.6 gallons per minute, which was sufficient to maintain the free lime content in the carbonating mixture at about 6 grams per liter, expressed as $Ca(OH)_2$. The total amount of lime thus added was 70 gallons.

Simultaneously with the addition of this milk of lime, we fed in, at the bottom of the tank, washed flue gas containing 10% carbon dioxide at the rate of about 200 cubic feet per minute. The temperature of the carbonating mixture was approximately 30° C.

From time to time during this conditioning carbonation, we removed samples of the precipitated calcium carbonate from the carbonating tank and tested them for particle size. As a convenient and rapid testing method, we measured the turbidity of a dilute suspension of the calcium carbonate under standardized conditions. When the percentage of fine particles in the precipitate had been reduced to the desired extent, we cut off the supply of milk of lime and continued the supply of washed flue gas for a few minutes until practically all of the free lime had been converted into calcium carbonate.

The particle sizes and percentages thereof resulting from this conditioning precipitation, or final carbonization, described above, are as follows:

| Percentage Sizes | Per Cent by Weight |
| --- | --- |
| 0-1 microns | 6 |
| 1-2 microns | 24 |
| 2-3 microns | 40 |
| 3-4 microns | 20 |
| 4-6 microns | 5 |
| 6-8 microns | 2 |
| 8-10 microns | 2 |
| above 10 microns | 1 |
| | 100 |

By comparing the percentages of different particle sizes just above with those present in the original, fine, calcium carbonate shown previously above, it will be noted that the extremely fine particles, i. e., those 0-1 microns in diameter, have been reduced in amount from 28% in the initial calcium carbonate to 6% in the total precipitate; and the next size, still very fine, particles 1-2 microns in diameter, have been decreased in amount from 52% to 24%. Similarly, the amount of particles larger than 2 microns has been increased from an original percentage of 20% to 70%, all as a result of the conditioning precipitation mentioned above. As a matter of identification, therefore, our process may be regarded as one for converting a calcium carbonate, having a minor proportion of particles larger than 2 microns in size, into a calcium carbonate having a major proportion of particles larger than 2 microns. Furthermore, it will be noted from the percentages given just above that while the particle sizes have been increased by this conditioning precipitation, the increase in size has been controlled substantially within the relatively narrow range below 4 microns, and there is only a minor percentage, e. g., 10%, of particles having a size greater than 4 microns. As a matter of fact the final carbonate, produced as above described, consists principally of particles between 2 and 4 microns in size, the percentage of these in the above typical case being 60%.

It will be noted from the above, that the original calcium carbonate, which we used for converting or coarsening into the final carbonate, was very fine, although it was not colloidal, since it consisted predominately of particles 1 to 2 microns in size. These are many times larger than colloidal particles, which, according to definition, are within the size range of $\frac{1}{10}$ to $\frac{1}{1000}$ micron. While we might possibly start with colloidal calcium carbonate and coarsen it sufficiently to produce the type of calcium carbonate which we desire for use in cigarette paper, for example, one having a major proportion of particle sizes above two microns and usually between 2 and 4 microns, we prefer not to start with a calcium carbonate this fine. Our process may be carried out entirely satisfactorily by starting with a calcium carbonate having a major proportion of particle sizes between 1 and 2 microns, as shown in the first table above.

As indicated above we may obtain the fine, starting calcium carbonate material for our process from any suitable source. In practice, we have found it advantageous to prepare this carbonate by precipitation with carbon dioxide of a slaked lime solution under predetermined conditions of time, temperature, concentration, agitation, etc. Adventitious variations in the particle size frequency distribution characteristics of various batches thus prepared are compensated for by our method of conditioning, in which this precipitated calcium carbonate is subjected to the influence of a second precipitation of slaked lime with carbon dioxide, which second precipitation is carried out in an aqueous suspension of this previously precipitated calcium carbonate. This commercially advantageous, though nonrestrictive, process of our invention may thus be considered as a two-stage, or two-step, precipitation process and is thus referred to hereafter.

In this two-stage precipitation process, a small percentage of the lime used in the first stage may be left unreacted. Thus, we have found it convenient to leave up to about 5% of the total slaked lime unreacted in the first stage precipitation in order to save time, since the carbonation usually slows down considerably when almost all of the lime has been carbonated. In carrying out the second step, or conditioning precipitation, we ordinarily continue the introduction of carbon dioxide into the carbonator after the supply of calcium hydroxide has been discontinued, until the residual, unreacted calcium hydroxide, which is present in the carbonator when the supply of calcium hydroxide is discontinued, has been neutralized.

In the conditioning precipitation step, we have found it expedient and effective to add the lime to the particles of calcium carbonate undergoing conditioning or coarsening at a rate such that, at any moment, unreacted calcium hydroxide is present in the carbonator in amount within the range of, say, about 1% to, say, about 25% of the weight of total calcium carbonate present. If the percentage of unreacted lime falls below 1%, the process tends to be, generally speaking, unduly slow. If the percentage increases substantially above 25%, we find that the desired control of the particle size is difficult and that the process approaches, from the standpoint of difficulty of control, a conventional carbonating process in which no fine calcium carbonate is used as a starting material.

To facilitate control in the conditioning step, we prefer to have the lime being added to the carbonating apparatus at a concentration equivalent to the concentration of the calcium carbonate suspension undergoing coarsening. Under this condition, the concentration of total calcium carbonate in the treating system manifestly remains constant.

When the final carbonation is completed, the precipitated calcium carbonate may be filtered and dried, or it may be used directly in slurry form, as a filler for paper by admixture with the paper furnish.

Various modifications may be made in the above described materials and procedures without departing from the scope of our invention as defined in the appended claims.

We claim:

1. The process of producing precipitated calcium carbonate of a desired particle size range, which is characterized by the step of first preparing precipitated calcium carbonate having a major portion of its particles of a size substantially finer than desired and less than two microns in size, then selectively coarsening these fine particles so that the major portion thereof will be increased in particle size and fall within the range of approximately two to four microns in size, said selective coarsening being effected by introducing into an aqueous suspension of said fine calcium carbonate, a calcium hydroxide suspension having a concentration very much higher than that of a saturated solution of calcium hydroxide, and simultaneously therewith introducing carbon dioxide-containing gas, at such rates as to maintain a positive excess of free calcium hydroxide, and continuing the introduction of said calcium hydroxide and carbon dioxide gas until a major portion of the calcium carbonate particles in the resulting suspension have selectively increased in size and fall within the particle size range of approximately two to four microns, the aforesaid process not requiring the application of heat or control of temperature.

2. The process of producing precipitated calcium carbonate of a desired particle size range, which is characterized by the step of first preparing precipitated calcium carbonate having a major portion of its particles of a size substantially finer than desired and less than two microns in size, then selectively coarsening these fine particles so that the major portion thereof will be increased in particle size and fall within the range of approximately two to four microns in size, said selective coarsening being effected by introducing into an aqueous suspension of said fine calcium carbonate, a calcium hydroxide suspension having a concentration very much higher than that of a saturated solution of calcium hydroxide, and simultaneously therewith introducing carbon dioxide-containing gas, at such rates that the amount of unreacted calcium hydroxide in the calcium carbonate suspension is maintained between 1% and 25% of the total weight of calcium carbonate, and continuing the introduction of said calcium hydroxide and carbon dioxide gas until a major portion of the calcium carbonate particles in the resulting suspension have selectively increased in size and fall within the particle size range of approximately two to four microns, the aforesaid process not requiring the application of heat or control of temperature.

3. In a process of producing precipitated calcium carbonate using calcium hydroxide and carbon dioxide gas, the improvement in control of the process conditions so as to obtain the desired particle size range in the finished product, comprising the step of introducing into a suspension of calcium carbonate having a major portion of its particles of a size finer than desired and less than two microns in size, a suspension of calcium hydroxide having a concentration very much higher than that of a saturated solution of calcium hydroxide, and simultaneuosly therewith a stream of carbon dioxide gas at such a rate that the particles of said fine calcium carbonate suspension are increased in size so that the predominant proportion falls within the range of approximately two to four microns, and stopping the introduction of said calcium hydroxide suspension and carbon dioxide gas at a point when the resulting suspension has atttained this particle size range, the aforesaid process not requiring the application of heat or control of temperature.

4. A process for converting a calcium carbonate having a minor proportion by weight of particles of a size between 2 and 4 microns into a calcium carbonate having a major proportion by weight of particles of a size between 2 and 4 microns, comprising first preparing an aqueous suspension of the calcium carbonate having a minor proportion by weight of particles of a size between 2 and 4 microns, and secondly modifying the size of the particles thus produced by introducing into said suspension controlled amounts of a calcium hydroxide suspension and carbon dioxide, thereby effecting precipitation therefrom of additional calcium carbonate and selectively coarsening said suspension of calcium carbonate until the calcium carbonate has a major proportion by weight of particles of a size between 2 and 4 microns, the aforesaid process not requiring the application of heat or control of temperature.

MILTON O. SCHUR.
ROBERT M. LEVY.

REFERENCES CITED

The following references are of record in the file of this patent:

UNITED STATES PATENTS

| Number | Name | Date |
| --- | --- | --- |
| 2,045,301 | Langer | June 23, 1936 |
| 2,080,616 | Lynn et al. | May 18, 1937 |
| 2,188,663 | McClure et al. | Jan. 30, 1940 |
| 2,196,949 | Young | Apr. 9, 1940 |
| 2,211,796 | Schneider | Aug. 20, 1940 |
| 2,295,291 | Roderick | Sept. 8, 1942 |
| 2,415,074 | Clark et al. | Feb. 4, 1947 |